(12) United States Patent
Kaehr

(10) Patent No.: US 7,046,440 B1
(45) Date of Patent: May 16, 2006

(54) 3-D VISION SYSTEM FOR SWIMMING POOLS

(76) Inventor: Jeffrey L. Kaehr, 6798 E. 1000 South, LaFontaine, IN (US) 46940

( * ) Notice: Subject to any disclaimer, the term of this patent is extended or adjusted under 35 U.S.C. 154(b) by 0 days.

(21) Appl. No.: 10/238,181

(22) Filed: Sep. 10, 2002

(51) Int. Cl.
*G02B 27/22* (2006.01)

(52) U.S. Cl. .................. 359/464; 359/472; 359/477

(58) Field of Classification Search ................ 359/464, 359/472, 477; 4/494
See application file for complete search history.

(56) References Cited

U.S. PATENT DOCUMENTS

| | | |
|---|---|---|
| 4,620,770 A | 11/1986 | Wexler |
| 5,101,269 A | 3/1992 | Shelley et al. |
| 5,271,106 A | 12/1993 | McClish et al. |
| 5,363,151 A * | 11/1994 | Biays et al. .................. 351/43 |
| 2001/0022563 A1* | 9/2001 | Ishikawa ....................... 345/9 |

FOREIGN PATENT DOCUMENTS

| JP | 06303647 A | * 10/1994 |
|---|---|---|
| JP | 09134110 A | * 5/1997 |
| JP | 2001129245 A | * 5/2001 |

* cited by examiner

*Primary Examiner*—Mark A. Robinson
*Assistant Examiner*—Lee Fineman
(74) *Attorney, Agent, or Firm*—Paul W. O'Malley; Susan L. Firestone

(57) ABSTRACT

A decorative treatment for swimming pools provides underwater anaglyphs for adhesion to the pool sides and filtering stereoscopic underwater goggles for use by swimmers in viewing the anaglyphs.

9 Claims, 5 Drawing Sheets

3-D VISION SYSTEM FOR SWIMMING POOLS

BACKGROUND OF THE INVENTION

1. Field of the Invention

The present invention relates to decorative enhancements for swimming pools and more particularly to a stereoscopic viewing system based on submerged anaglyphs in swimming pools and filtering stereoscopic goggles for use by swimmers in viewing the anaglyphs.

2. Description of the Problem:

Public stereoscopic viewing systems rely on presenting two slightly different views of a subject to each of a viewers' eyes. The anaglyph is a key element of such viewing systems. An anaglyph is a stereogram in which the two views of a subject are printed or projected, substantially superimposed, in complementary colors, usually red and blue. Transmission of the red view may be blocked using a red filter and the blue view can be blocked by blue filter. Placing one each of the appropriate filters in front of each eye results in each eye seeing only one of the two colored views. The filters are typically incorporated into spectacles so that when the anaglyph is viewed through the spectacles, an illusion of depth is produced because each eye is seeing elements of the subject from slightly different aspects.

The basic principal of presenting two horizontally shifted views of the same subject to each eye of the viewers can be implemented in other ways, such as using polarizing filters or projecting alternating views of a subject and supplying the viewers with head sets having synchronized shutters. Obviously, the quality of image produced can suffer somewhat due to the modifications required of the underlying images. U.S. Pat. No. 4,620,770 to Wexler addresses the tendency of color stereoscopic systems to appear monochromatic when viewed through filtering spectacles by adding one or more colors to one of images. The modified anaglyphs of Wexler appear more normally colored when viewed through filtering spectacles.

The systems described above are characterized as public to distinguish them from full color systems, such as the VIEWMASTER™ stereoscopic viewers, which use binocular type optical paths to deliver offset, but full color, views of a subject to each eye. This latter type of system, while providing an excellent image because the prints or projections are unmodified in terms of color or polarization, is inherently a private system being usable by only one person at a time.

Public stereoscopic image systems based on color, light polarization and shutter synchronization have been used with television and computer games, in movie theaters, and in books. In such settings, the reproduced image is largely the focus of the viewers' activities. Prior art public stereoscopic image systems have been based on the assumption that while people would choose to wear filtering spectacles for purposes of entertainment, they would not be likely to choose to wear such spectacles while active in other pursuits.

It is an object of the invention to apply to public stereoscopic image systems to environments where people can readily use filtering spectacles in the course of other activities.

It is a further object of the invention to provide a public stereoscopic image system which enhances the three dimensional effect of the image on viewers.

It is yet another object of the invention to apply to public stereoscopic image systems as an ambiance enhancing element to swimming pools and other outdoor swimming environments.

SUMMARY OF THE INVENTION

According to the invention there is provided a public spectroscopic viewing system comprising a pool of water, an anaglyph submerged in the pool of water, an air/water barrier between the eyes of a viewer and the anaglyph and filter spectacles for the viewer to wear which pass differing views from the anaglyph to each of the viewer's eyes. The anaglyph is encased in, or applied to, a water proof sheet which may be in turn applied to an interior face of the pool. The sheet is preferably retained in place on the pool's face by an adhesive such as petroleum jelly.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
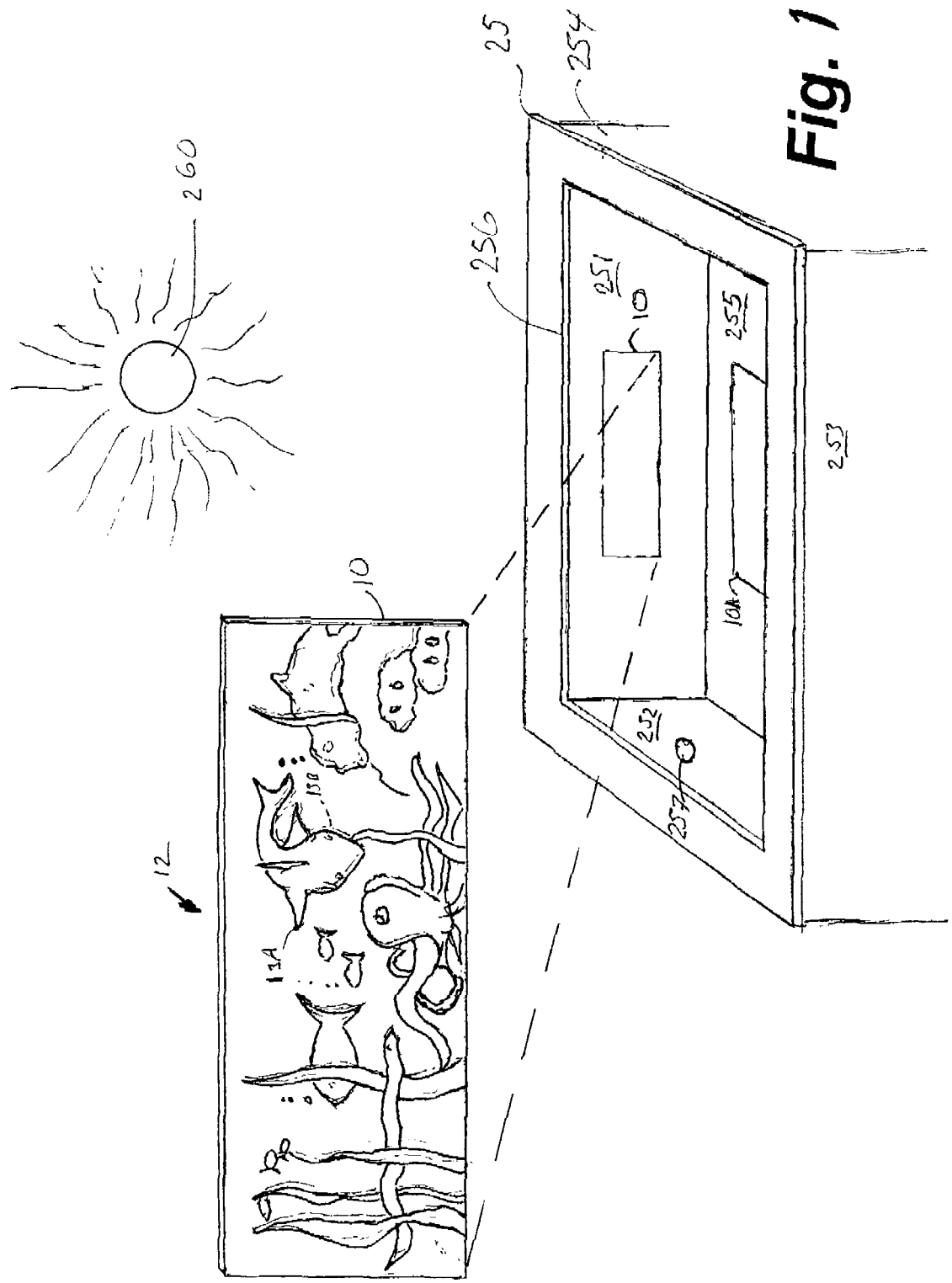
FIG. 1 is a exploded, perspective view of a swimming pool illustrating positioning of a anaglyph structure.

Referring now to the figures and in particular to FIG. 1 there is illustrated a swimming pool 25 having four vertical sides 251, 252, 253 and 254 and a bottom 255. Swimming pool 25 is preferably an open air pool for illumination by the sun 260. While natural light gives the best results, the system can be implemented in an indoor pool or fountain, and be illuminated from other light sources, such as an underwater lamp 257 as shown installed in pool side 252. Attached to vertical side 251 and pool bottom 255 are anaglyph structures 10 and 10A. Anaglyph structures 10 and 11A are preferably vinyl sheets on which an anaglyph 12, which includes two horizontally separated but partially superimposed views 13A and 13B of a scene, may be printed or embossed. Anaglyph 12 may be a color anaglyph representing an underwater scene appropriate for decorating a pool. Anaglyph structures 10, 10A may be attached to pool sides or bottoms with the anaglyph oriented away from the supporting structure for viewing. Attachment of an anaglyph structure to a pool surface is effected using an adhesive. This allows the structures to be periodically changed allowing change in scenery. Pool 25 is designed to be filled with water to near the pool's edge 256. As is well known, air and water have differing indices of refraction, and objects submerged in water but viewed from across a water/air barrier can appear substantially magnified in size. Anaglyph 12 is illuminated by either natural or artificial light, both from outside the pool or in the pool.

Figure 2:
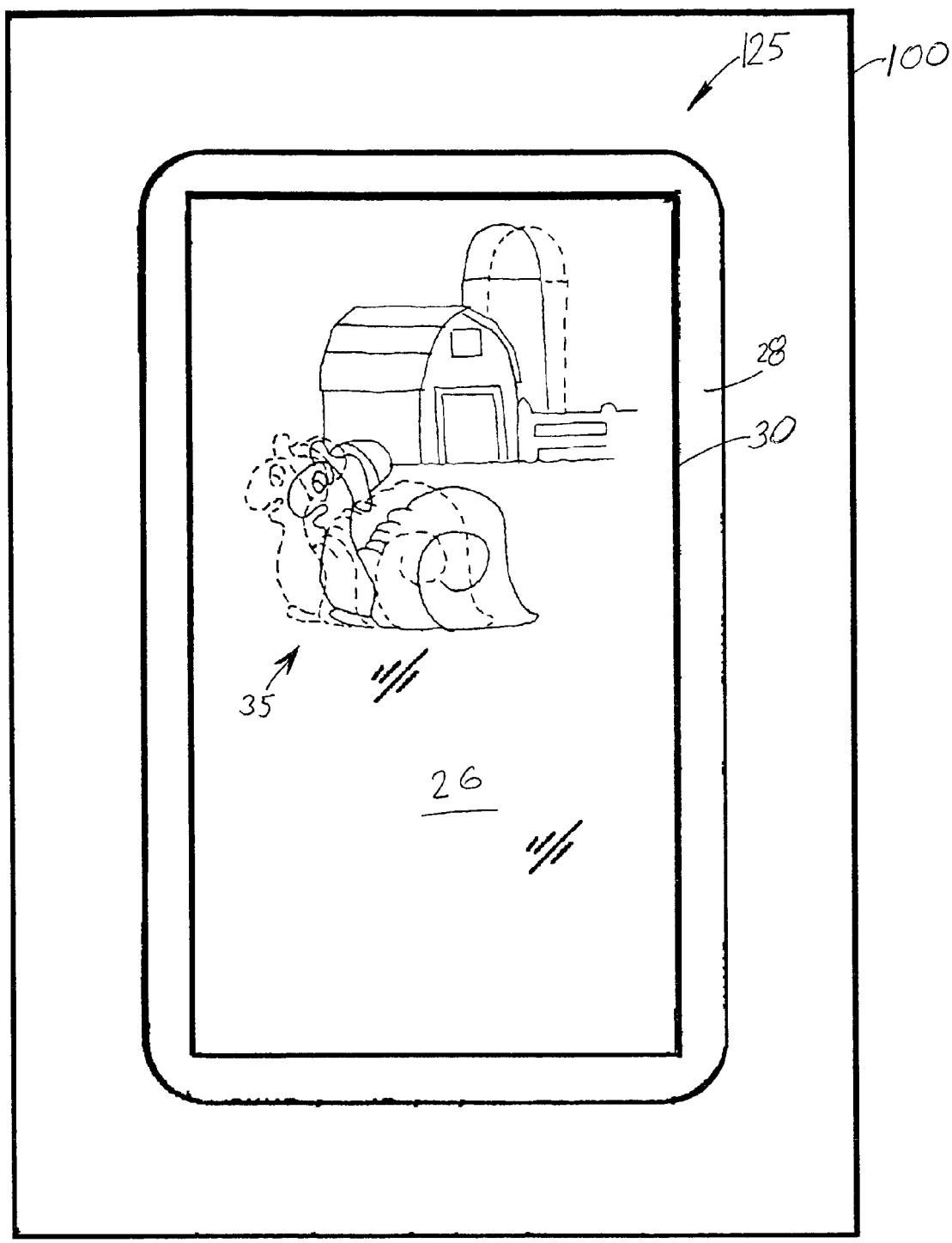
FIG. 2 is a top plan view of a swimming pool with a anaglyph applied to the bottom surface thereof.

Swimming pools may be lined with vinyl or they may have concrete sides. Referring now to FIG. 2, a second pool 125, having vinyl sides 30 and a vinyl bottom 26 is illustrated in which an anaglyph 35 has been directly incorporated into the vinyl of the pool bottom. Pool 125 is set in deck area 100 having a fascia 28 surrounding the pool.

Figure 3:
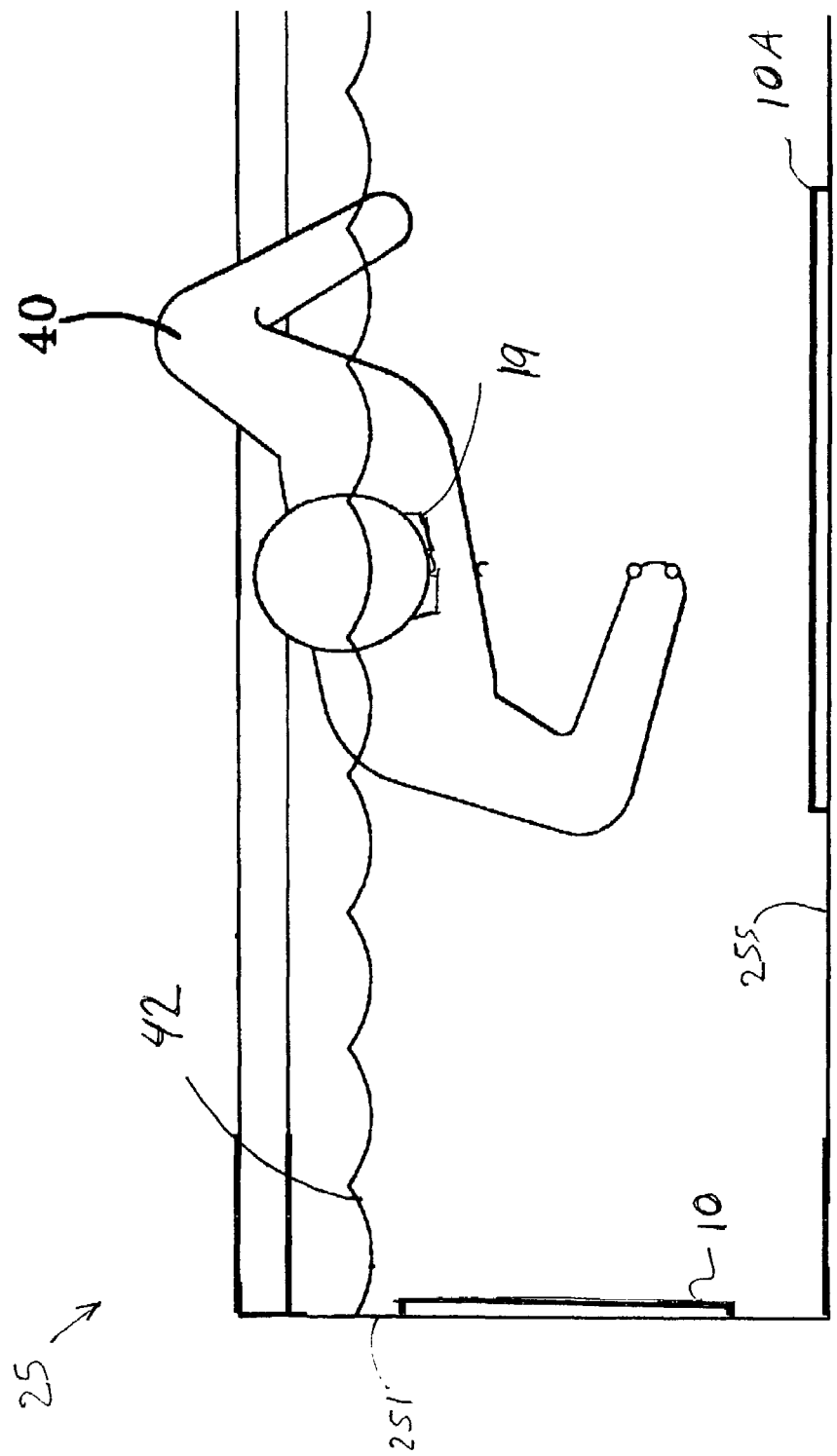
FIG. 3 is a cross sectional view of a swimming pool in which a swimmer can view anaglyphs positioned on the sides or bottom surfaces of the pool.

In FIG. 3 a swimmer 40 floating in water 42 contained in pool 25 can view anaglyph structures 10 and 10A attached to the pool bottom 255 and pool side 251. Anaglyph structures 10 and 10A are fully submerged in water 42 and illuminated allowing swimmer 40 to see the anaglyphs on the exposed sides of the anaglyph structures 10 and 10A. Swimmer 40 wears swimming goggles 19 with differentially colored lenses to produce the three dimensional effect and thereby adding interest in the swimming experience.

Figure 4:
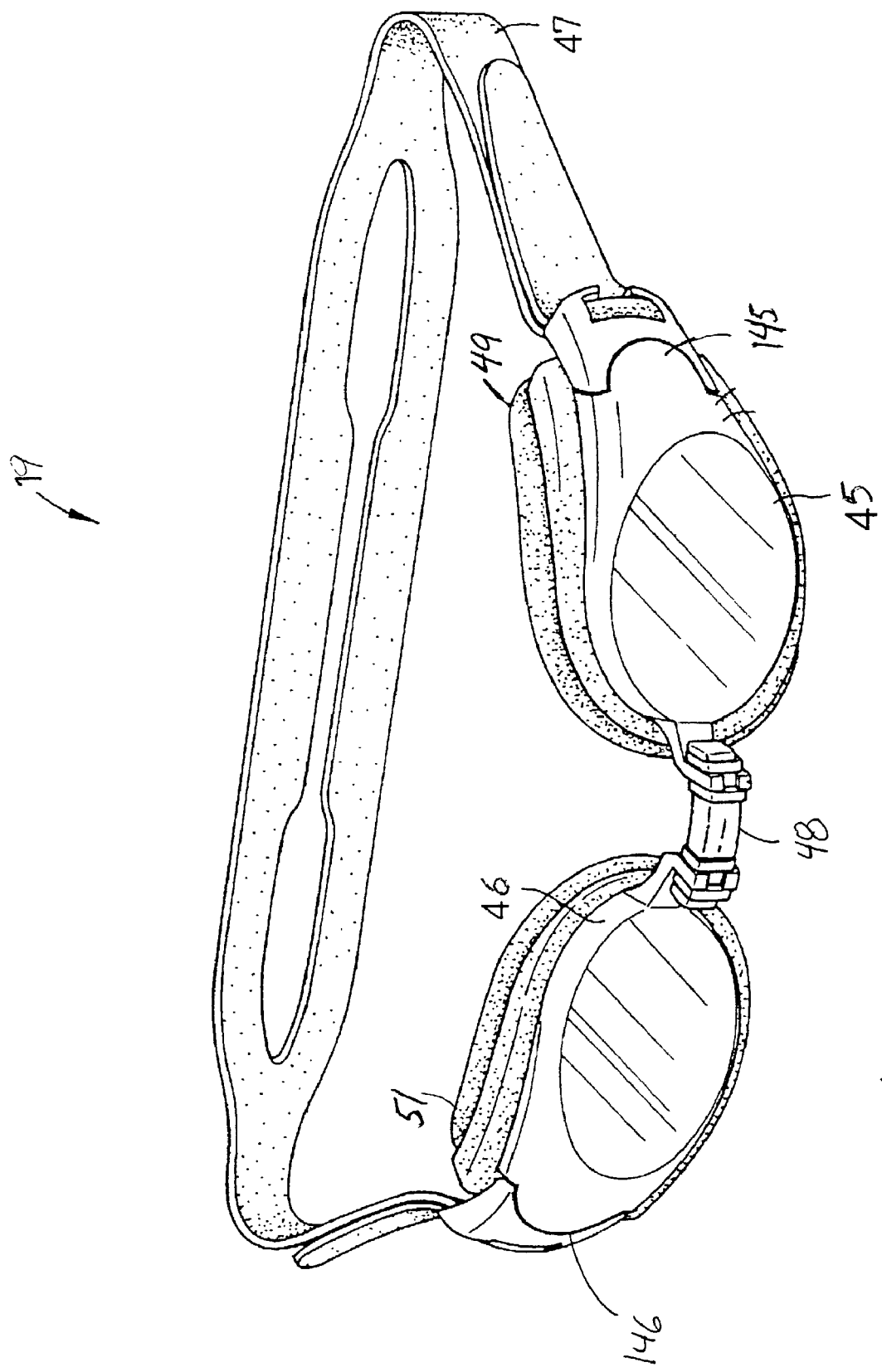
FIG. 4 is a perspective view of a pair of swimming goggles which incorporate filtering lenses in complementary colors.

Referring to FIG. 4 swimming goggles 19 are depicted having a left eye piece 145 and a right eye piece 146 held together in a loop by an adjustable elastic strap 47 and a nose bridge 48. Goggles 19 are illustrative of a type of eye wear that can be adapted for use as stereoscopic spectacles for use with a submerged anaglyph, and one that is advantageously employed with anaglyphs of the present invention because they can be adapted to provide the necessary optical filtering required to produce the three dimensional illusion of the stereoscopic viewing system while providing a barrier between water and air. As a result, the image seen by a user is magnified. Eyepieces 145 and 146 are backed by form fitting, pliable cushions 49 and 51, which fit around the eye sockets of the swimmer and trap air against a small portion of the wearer's face including the eyes. Lenses 45 and 46 form the front portion of eyepieces 145 and 146 and are made of clear plastic, with lens 45 being tinted red and lens 46 being tinted blue, which are the usual filter combinations for common anaglyphs.

Figure 5:
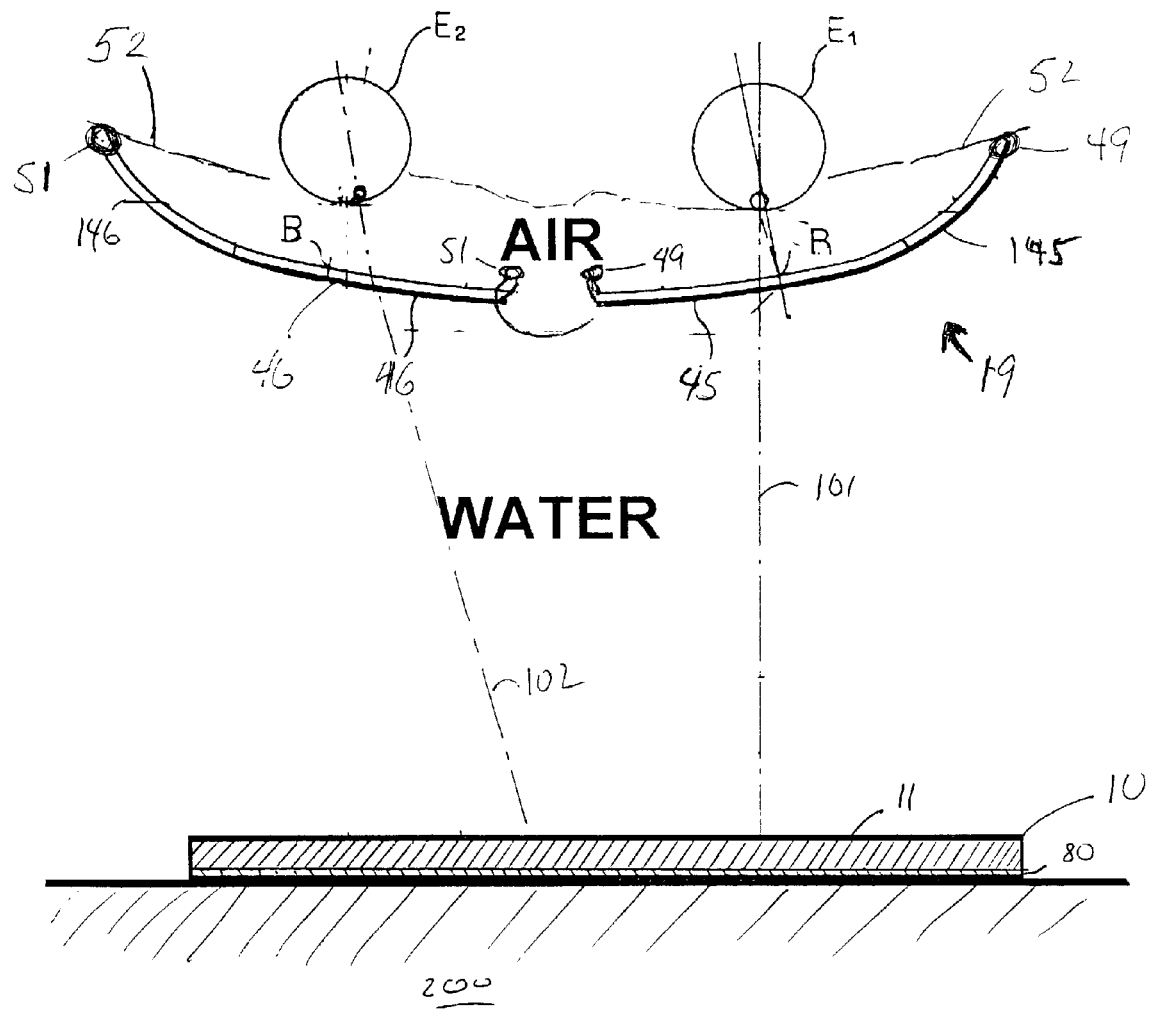
FIG. 5 is a cross-section view of the stereoscopic image system of the present invention.

Referring to FIG. 5 the cooperation of the elements of the stereoscopic viewing system of the present invention is illustrated. A anaglyph structure 10 is applied to a wall or other base 200 using a coating 80 of a water repelling but slow dissolving adhesive such as petroleum jelly. Structure 10 is submerged under water and oriented so that the anaglyph is on face 11 away from the wall. A viewer of the anaglyph is turned so that his eyes E1 and E2 are directed toward the anaglyph, but are separated from the water by a layer of air trapped against his face 52 by goggles 19. Goggles 19 comprise cushions 49 and 51 which are urged into sealing contact with face 52 by strap 47 and potentially by external water pressure on eyepieces 145 and 146. Lines of sight 101 and 102 from eyes E1 and E2 are illustrated as canted with respect to another to emphasize the parallax differences between the views presented in the anaglyph as perceived by the viewer's left and right eyes. These differences give the viewer the illusion of depth in the processed image. Line of sight 102 is further bent to indicate the difference in the refractive indices for water and air, which magnifies the image. Lens 45 is indicated by the letter R as being a red filter and lens 46 is indicated by the letter B as being a blue filter. The stereoscopic viewing system of the invention can be used with conventional stereoscopic spectacles worn by a viewer whose face is above the pool of water.

The invention provides a public stereoscopic viewing system in a swimming environment where people can readily use goggles configured as filtering spectacles in the course of other activities. This allows the effective use of anaglyphs as decorative treatments in swimming pools. The water to air barrier provided by the goggles, or the atmosphere enhances the three dimensional effect of the image on viewers by magnifying the perceived image.

While the invention is shown in only two of its forms, it is not thus limited but is susceptible to various changes and modifications without departing from the spirit and scope of the invention.

What is claimed is:

1. A public stereoscopic image system, comprising:
   a pool of water;
   an anaglyph of a still scene submerged in the pool of water; and
   filtering spectacles having first and second lenses to be worn by a viewer of the anaglyph, the filtering spectacles being made of a pliable material shaped to form fit to a portion of the face of the viewer so as to trap air between the face of the viewer and the first and second lenses and thus position an air/water barriers between the anaglyph and each of a viewer's eyes to magnify the still scene as seen by the viewer through the first lens over one eye and the second lens over the remaining eye.

2. A public stereoscopic image system as set forth in claim 1, wherein the anaglyph comprises first and second images of the still scene in complementary first and second colors and the first lens filters out the first color and the second lens filters out the second color.

3. A public spectroscopic image system as set forth in claim 2, further comprising the pool of water being open for exposure to natural light.

4. A public stereoscopic image system as set forth in claim 3, further comprising:
   a plurality of sides to the pool of water; and
   the anaglyphs being disposed on at least one of the sides.

5. A public stereoscopic image system as set forth in claim 4, wherein the anaglyph is imprinted on a flexible water proof backing.

6. A public stereoscopic image system as set forth in claim 5, wherein the flexible water proof backing being retained on a surface of the pool of water by a slow dissolving adhesive.

7. A public stereoscopic viewing system comprising:
   a pool of water;
   an anaglyph having a plurality of views of a scene submerged in the pool of water;
   an air barrier adjacent each of the eyes of a viewer of the anaglyph relative to the anaglyph effecting magnification of the scene as seen by a viewer; and
   filter spectacles for the viewer to wear which pass a different one of the plurality of differing views of the scene to each of the viewer's eyes.

8. A public stereoscopic viewing system as set forth in claim 7, further comprising:
   a vinyl water proof sheet on which the anaglyph is embossed.

9. A public stereoscopic viewing system as set forth in claim 8, wherein the vinyl water proof sheet is retained in place on a support surface by a slow dissolving adhesive.

* * * * *